(12) United States Patent
Glaesener

(10) Patent No.: US 6,261,505 B1
(45) Date of Patent: Jul. 17, 2001

(54) FRICTION TIEBAR CLAMP

(75) Inventor: Pierre Glaesener, Bissen (LU)

(73) Assignee: Husky Injection Molding Systems Ltd. (CA)

( * ) Notice: Subject to any disclaimer, the term of this patent is extended or adjusted under 35 U.S.C. 154(b) by 0 days.

(21) Appl. No.: 09/306,573

(22) Filed: May 6, 1999

(51) Int. Cl.[7] .................................................. B29C 45/64
(52) U.S. Cl. ................................. 264/328.1; 425/451.9; 425/595
(58) Field of Search ......................... 425/595, 451.9; 264/328.1

(56) References Cited

U.S. PATENT DOCUMENTS

| 2,691,799 | 10/1954 | Moeller . | |
|---|---|---|---|
| 3,183,555 | 5/1965 | Siegel . | |
| 3,449,795 | 6/1969 | Fischbach . | |
| 4,372,738 | * 2/1983 | Black et al. | 425/595 |
| 4,565,517 | 1/1986 | Brinkmann et al. . | |
| 5,133,655 | * 7/1992 | Schad et al. | 425/595 |
| 5,620,718 | * 4/1997 | Bohm | 425/595 |

FOREIGN PATENT DOCUMENTS

| 3144359 | 5/1983 | (DE) . |
| 2425321 | 7/1979 | (FR) . |
| 2411694 | 8/1979 | (FR) . |
| 1322012 | 7/1973 | (GB) . |
| WO 96/41711 | 12/1996 | (WO) . |

* cited by examiner

*Primary Examiner*—James P. Mackey
(74) *Attorney, Agent, or Firm*—Bachman & LaPointe, P.C.

(57) ABSTRACT

A mechanism for applying a clamping force to a columnar member, such as a tiebar, is described. The clamping mechanism includes a compressible member surrounding the columnar member for gripping the columnar member and transmitting a clamping force thereto, which compressible member is slidable along the columnar member. The mechanism further includes a clamping piston for applying a clamping force, which clamping piston has a bore with an engaging surface for receiving and frictionally engaging the compressible member. The frictional engagement between the compressible member and the engaging surface prevents any relative sliding movement between the compressible member and the clamping piston. The mechanism still further includes a sliding piston for applying a clamping force and for causing the compressible member to slide along the columnar member from an initial position to a preload position where the compressible member is compressed by contact with the engaging surface as the compressible member moves between the positions. Compression of the compressible member causes it to grip the columnar member and apply an initial clamping force. The main clamping force is applied to the compressible member and hence to the tiebar by moving the clamping piston to a clamping position. A method for applying a clamping force to a mold using the clamp mechanism of the present invention is also described.

22 Claims, 2 Drawing Sheets

FRICTION TIEBAR CLAMP

BACKGROUND OF THE INVENTION

The present invention relates to a mechanism for applying a clamping force to a columnar member which has particular utility in machines for molding articles.

Clamping systems for molding machines typically use means to lock the tiebars in order to connect and disconnect clamping pistons to them. For example, French patent 2,411,694 illustrates a friction means for gripping the column of a three platen machine in order to connect a clamping piston to the column. The design uses a conical locking ring that is pushed into a tapered sleeve, which causes the locking ring to deflect inward and grip the column passing through its central bore. FIG. 4 of this patent shows how the locking ring has longitudinal slots cut through it to facilitate this deflection. The problem with this approach is that the locking ring must slide inside its mating tapered piece in order to be deflected. The high forces generated during this sliding action cause wear on the mating surfaces which substantially shorten the useful life of such a device. Furthermore the friction in the conical seats limits the effectiveness of the gripping action.

U.S. Pat. No. 2,691,799 illustrates a different approach. In this patent, a collet-type locking ring is used to grip a tiebar.

U.S. Pat. No. 3,183,555 to Siegel illustrates an approach using a hydraulic pressure to deflect the walls of a sleeve to grip a tiebar.

U.S. Pat. No. 4,565,517 to Brinkmann illustrates an approach using oil pressure to act on a piston having a conical seat that causes ring segments to grip a tiebar.

German Patent No. 31 44 359 illustrates an approach using a hydraulic piston to push against wedge shaped segments to grip a rod of a piston.

Despite these systems, there still remains a need for a clamping mechanism with stronger gripping action which works faster to minimize the problems with wear and which can be built at a substantial cost saving.

SUMMARY OF THE INVENTION

Accordingly, it is an object of the present invention to provide an improved mechanism for applying a clamping force to a columnar member such as a tiebar.

It is a further object of the present invention to provide an improved mechanism for applying a clamping force which has utility in presses, molding machines, and injection molding machines.

It is yet a further object of the present invention to provide an improved mechanism for applying a clamping force which can be built at a substantial cost saving as compared to other mechanical locking techniques.

It is still a further object of the present invention to provide an improved method for applying a clamping force to a columnar member such as a tiebar.

The foregoing objects are attained by the clamping mechanism and method of the present invention.

In accordance with the present invention, a mechanism for applying a clamping force to a columnar member, such as a tiebar, comprises a compressible member surrounding the columnar member for gripping the columnar member and transmitting a clamping force thereto, which compressible member is slidable along the columnar member. The mechanism further comprises a first means for applying a clamping force, which first means has a bore with an engaging surface for receiving and frictionally engaging the compressible member. The frictional engagement between the compressible member and the engaging surface prevents any relative sliding movement between the compressible member and the first means. The mechanism still further comprises a second means for applying a clamping force and for causing the compressible member to slide along the columnar member from an initial position to a preload position where the compressible member is compressed by contact with the engaging surface as the compressible member moves between the positions. Compression of the compressible member causes it to grip the columnar member and apply an initial clamping force. The main clamping force is applied to the compressible member and hence to the tiebar by moving the first means to a clamping position. The force applied to the clamp piston during clamp up further increases the hinging effect on the sleeve and thus increases the radial deflection of the sleeve and the gripping action.

The clamping mechanism of the present invention has wide utility. It may be used on many different types of presses and molding machines. It has particular utility with injection molding machines for forming plastic articles.

In one aspect of the present invention, the clamping mechanism of the present invention may be used to applying a clamping force to a mold formed by a first mold half mounted to a first platen and a second mold half mounted to a second platen and having one or more tiebars extending between the first and second platens. The method for applying the clamping force to the mold comprises the steps of: closing the mold, providing a compressible member having a central bore with a diameter about each tiebar, a sliding piston for causing a respective compressible member to move between an initial position and a preload position, and a clamping piston for applying a main clamping force or a breaking force to the mold via the compressible member; activating the sliding piston to cause the respective compressible member with which it cooperates to slide along a tiebar between the initial position and the preload position without the compressible member sliding relative to the clamping piston, whereby the compressible member becomes compressed and grips the tiebar along which it slides; and activating the clamping piston by moving it to a clamping position to cause the compressible member to transmit a main clamping force to the mold via the tiebar.

Other details of the clamping mechanism and clamping method of the present invention, as well as other objects and advantages attendant thereto, are set forth in the following detailed description and the accompanying drawings, wherein like reference numerals depict like elements.

DETAILED DESCRIPTION OF THE PREFERRED EMBODIMENT(S)

Figure 1:
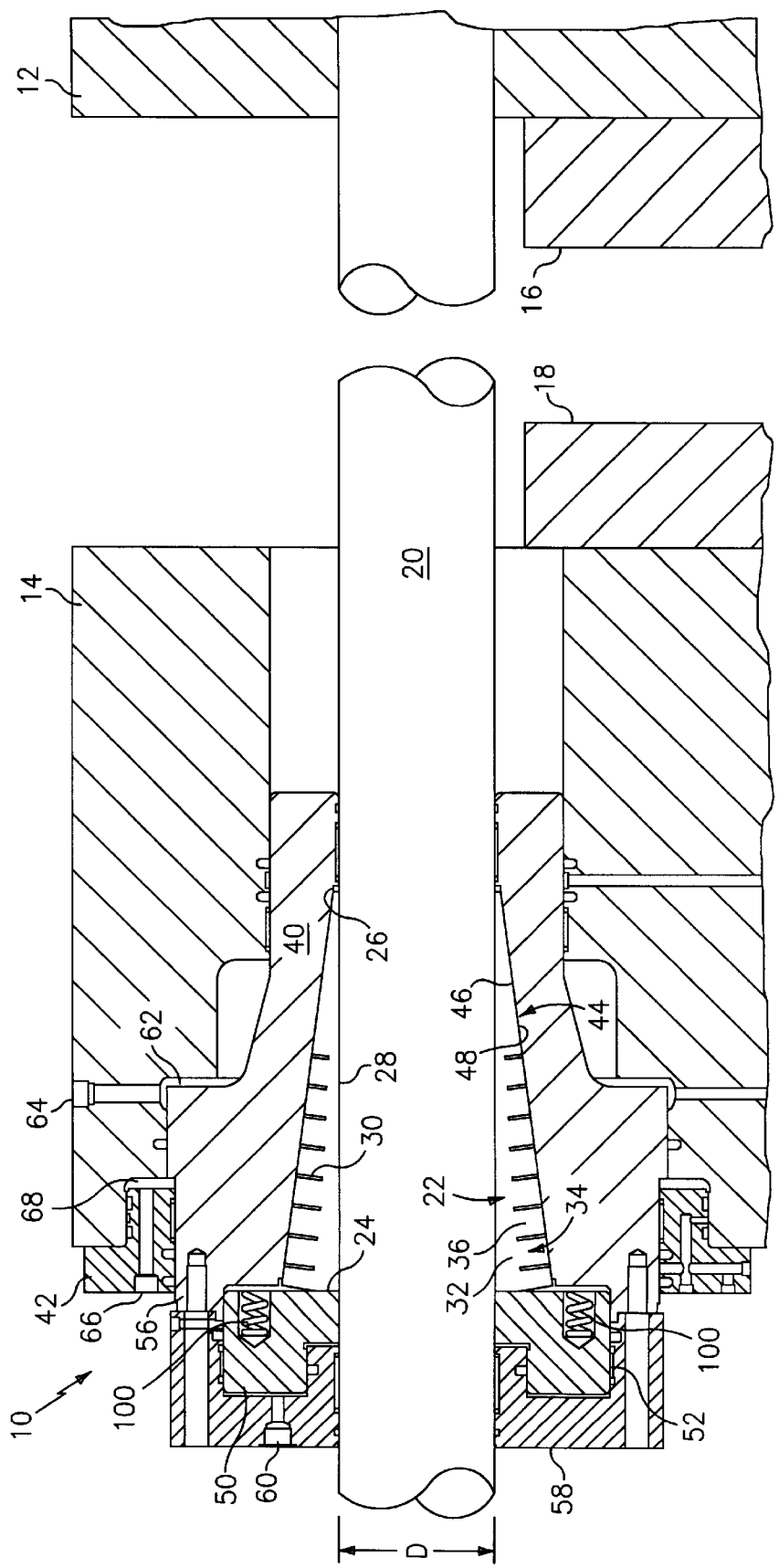
FIG. 1 is a sectional view of an embodiment of a clamping mechanism in accordance with the present invention.

Referring now to the drawings, FIG. 1 illustrates a clamping mechanism 10 in accordance with the present invention. The clamping mechanism 10 has broad utility and may be used with a wide variety of presses and molding machines.

For example, as shown in FIG. 1, it may be used with a molding machine having a first platen 12 and a second platen 14. Each platen may have a respective mold half 16, 18 affixed to it in any desired manner using any conventional means known in the art. One of the platens 12 and 14 may be stationary, while the other is movable. Alternatively, both platens 12 and 14 may be movable.

The molding machine also has one or more tiebars 20 extending between the platens 12 and 14. The supports for the tiebars do not form part of the present invention and are therefore not described in detailed. Any suitable tiebar supports known in the art may be used. The movable platen(s) 12 and/or 14 move(s) along the tiebar(s) 20 between mold open and mold closed positions. When the mold halves have assumed a mold closed position, a clamping force is applied to the mold to maintain the mold halves in that position. Similarly, when the mold is to be opened, a breaking force is applied to the mold to cause the mold halves to open. In accordance with the present invention, the mold clamping force and the mold breaking force are applied via the tiebar(s) via the clamping mechanism 10. While only one clamping mechanism 10 has been shown in FIG. 1 for simplicity purposes, it should be appreciated that one such clamping mechanism would be provided for each of the tiebar(s) 20.

Figure 2:
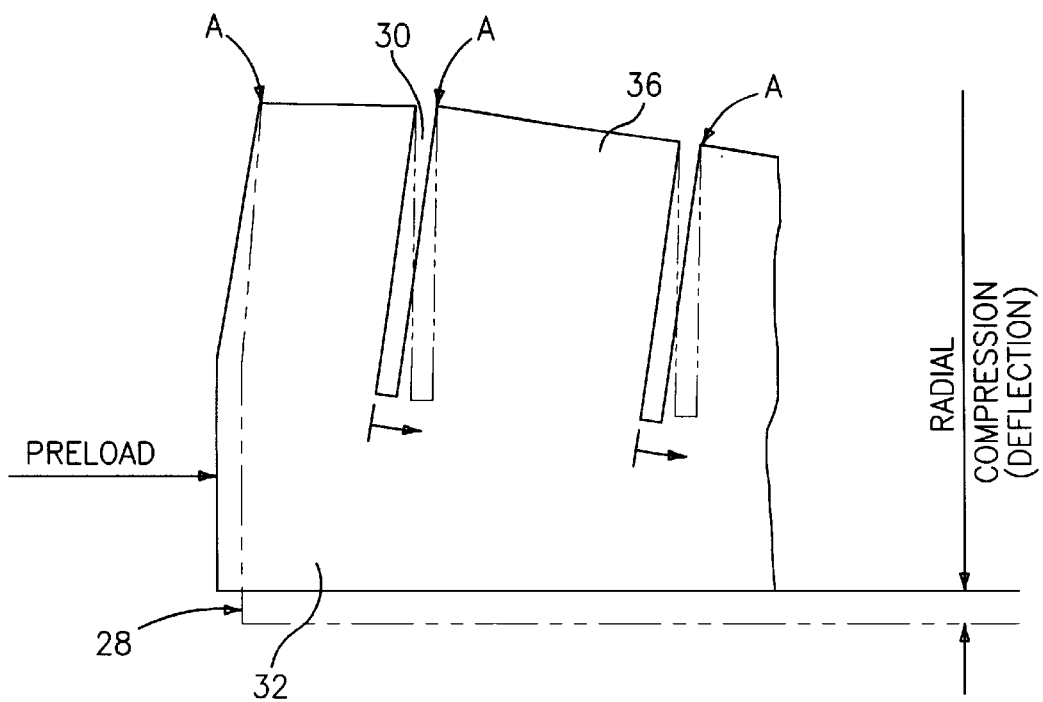
FIG. 2 is an enlarged section through a compressible member used in the clamping mechanism of FIG. 1.

The clamping mechanism 10 includes a compressible locking ring 22 which tapers from its base 24 to its leading edge portion 26. The locking ring 22 has a central bore 28 of a diameter D through which a respective tiebar 20 passes. The locking ring 22 is adapted to slide along the tiebar 20 between an initial position and a preload position. As shown in FIGS. 1 and 2, the locking ring 22 has a plurality of circumferential slots 30 and an annular body portion 32. The circumferential slots 30 divide an outer portion 34 of the locking ring 22 into a plurality of segments 36. As can be seen from FIG. 1, the circumferential slots 30 and the segments 36 do not necessarily extend along the entire length of the locking ring 22. In a preferred configuration however, the slots 30 and the segments 36 extend over most of the length of the locking ring 22.

The clamping mechanism 10 further includes a clamping piston 40 housed within the platen 14. The clamping piston 40 is used to apply a main clamping force to the mold via the compressible locking ring 22 and the tiebar 20. The clamping piston 40 is also preferably used to apply a breaking force to the mold via the compressible locking ring 22 and the tiebar 20. The clamping piston 40, in operation, moves between the initial position shown in FIG. 1 to a clamping position. The stroke of the clamping piston 40 is limited by a cover plate 42 which is bolted to the platen 14.

As can be seen from FIG. 1, the clamping piston 40 has a tapered internal bore 44 which has a tapered surface 46 that frictionally engages the external surface 48 of the compressible member. The frictional engagement between the tapered surface 46 and the external surface 48 prevents any sliding movement between the locking ring 22 and the clamping piston 40 as the locking ring 22 moves along the tiebar 20 between its initial position and its preload position.

A sliding piston 50 is provided to move the locking ring 22 between the initial position shown in FIG. 1 and the preload position. The sliding piston 50 is located in a cylinder 52 defined by an annular groove 54 in a tip portion 56 of the clamping piston 40 and an end plate 58 bolted to the tip portion 56. The end plate 58 limits the stroke of the sliding piston 50.

In operation, pressurized oil is supplied via port 60 to the cylinder 52. This causes the sliding piston 50 to move towards the clamping piston 40. As a result, the compressible locking ring 22 slides along the tiebar 20 from its initial position to its preload position. The locking ring 22 does not slide within the tapered bore 44 because of the high coefficient of friction that exists between the surfaces 46 and 48. As shown in FIG. 2, instead of sliding, movement of the locking ring 22 to the preload position causes each segment 36 to grip the surface 46. This results in a hinging action about each contact point A so that the annular body portion 32 of the compressible locking ring 22 is forced toward the tiebar 20 and the diameter D of the central bore 28 is decreased by an amount d. (FIG. 2 illustrates the radial compression or deflection of the locking ring 22.) This, in turn, results in the compressible locking ring 22 gripping the tiebar 20 and effectively coupling the clamping piston 40 to the tiebar 20. It also results in the application of a small initial clamping force to the tiebar 20. The aforementioned hinging action may be likened to a stack of spring washers being compressed. If the outer diameter of the spring washers is constrained within a sleeve, the central bore through them will decrease in diameter if sufficient axial force is applied by the clamp piston 40.

The main clamping force is applied by supplying high pressure oil to the cylinder 62 via the port 64 and causing the clamping piston 40 to move toward the sliding piston 50. The movement of the clamping piston 40 applies the main clamping force to the compressible locking ring 22 which transmits it to the tiebar 20 and onto the mold. It has been found that a relatively high clamping force can be transmitted to the mold in this fashion.

When it is time to open the mold, a mold break force is transmitted to the mold via the locking ring 22 and the tiebar 20. The mold breaking force is created by withdrawing oil from the cylinder 62 via the port 64 and supplying high pressure oil via port 66 to the cylinder 68. Movement of the clamping piston 40 away from the cover plate 42 creates a force that causes the mold to be forced open. This breaking force is typically 10% of the clamping force applied by the clamping piston 40. As a result, a correspondingly smaller projected area can be employed. Small mold break forces may also be applied by the mold stroke cylinder (not shown).

After the mold breaking force has been applied, the compressible locking ring 22 may be moved from its preload position to its initial position if desired. This can be done by withdrawing fluid in cylinder 52 via port 60 and allowing the elastic properties of the compressible locking ring 22 to push sliding piston 50 to its initial position. If necessary, compression springs 100 may be provided in pockets in the sliding piston 50 to help push back the sliding piston 50 for faster movement.

Figure 3:
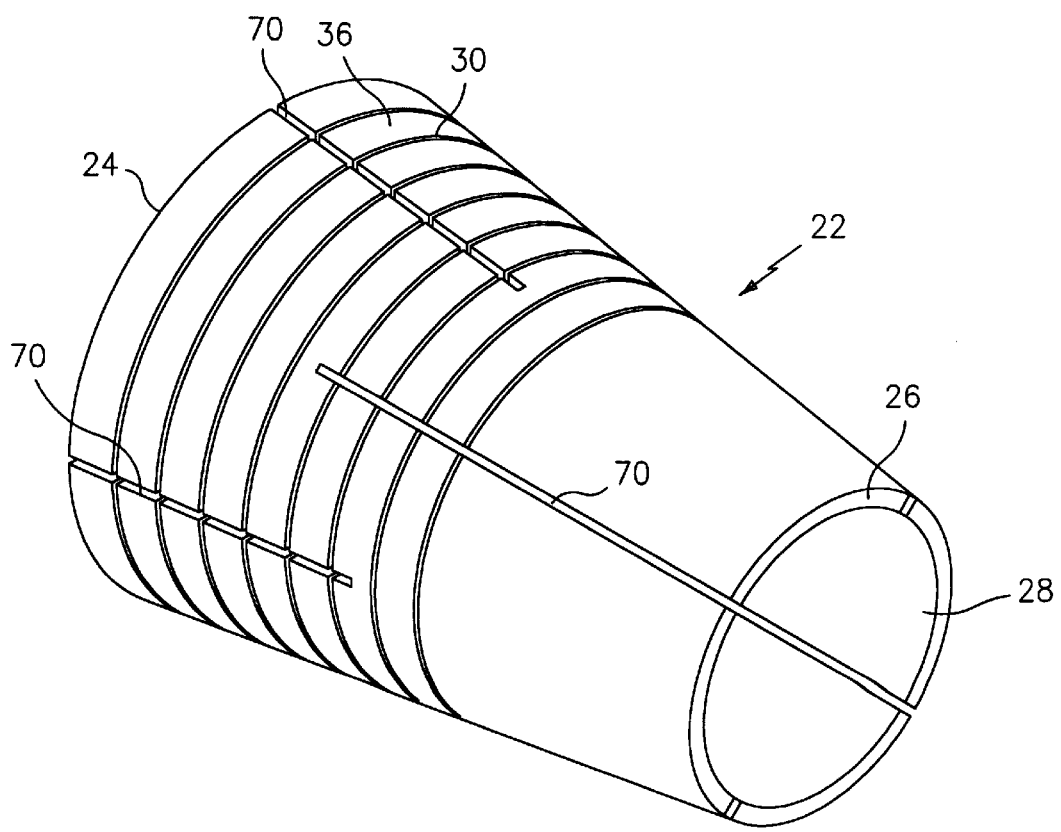
FIG. 3 is an isometric view of an alternative embodiment of a compressible member to be used in the clamping mechanism of FIG. 1.

The material of the locking ring 22 preferably is flexible and elastic. For example, the locking ring 22 may be formed from a high strength plastic material. It is possible to form the locking ring 22 from a metallic material; however, as shown in FIG. 3, longitudinal slots 70 will preferably be provided to help facilitate the radial compression.

One of the advantages to the clamping mechanism of the present invention is that accurate guiding of the tiebar 20 next to the locking ring 22 and close tolerances allow small gaps between the locking ring 22 and the tiebar 20 and minimum material deformation during clamping.

Other advantages to the clamping mechanism of the present invention is that it works faster than a teeth engaging method. One reason for fast operation is the fact that there is no clearance between teeth to be bridged. This is mainly important to avoid time loss when changing to mold break after clamp up. Another advantage is that the pistons 40 and 50 do not need to be turned unlike bayonet locking seal arrangements where the seals in the rotating pistons create friction which requires high torque to rotate them. The time and energy for this is saved. Further, the clamping mechanism of the present invention can be built at a substantial cost saving versus other mechanical locking methods.

It is apparent that there has been provided in accordance with the present invention a friction tiebar clamp which fully satisfies the means, objects, and advantages set forth hereinbefore. While the present invention has been described in the context of specific embodiment thereof, other variations, alternatives, and modifications will be apparent to one of skill in the art after reading the instant description. It is intended to embrace those variations, alternatives, and modifications which fall within the broad scope of the appended claims.

What is claimed is:

1. A mechanism for applying a clamping force to a columnar member, said mechanism comprising:
   a compressible member surrounding said columnar member for gripping said columnar member and transmitting said clamping force thereto, said compressible member being slidable along said columnar member;
   said compressible member having an annular body portion, a central bore having a diameter within said annular body portion, and a plurality of circumferential slots which define a plurality of segments;
   each of said segments frictionally engaging said engaging surface of said first means during movement of said compressible member along said columnar member, said frictional engagement resulting in a hinging action which causes the annular body portion to be forced toward said columnar member and a decrease in said diameter of said central bore;
   first means for applying a clamping force, said first means having a bore with an engaging surface for receiving and frictionally engaging said compressible member, said frictional engagement between said compressible member and said engaging surface preventing any relative sliding movement between said compressible member and said first means;
   second means for applying a clamping force and for causing said compressible member to slide along said columnar member from an initial position to a preload position where said compressible member is compressed by contact with said engaging surface as said compressible member moves between said positions; and
   said first means being movable to a clamping position where a main clamping force is applied to said columnar member via said compressible member.

2. A mechanism for applying a clamping force to a columnar member, said mechanism comprising:
   a compressible member surrounding said columnar member for gripping said columnar member and transmitting said clamping force thereto, said compressible member being slidable along said columnar member;
   said compressible member having an annular body portion, a central bore having a diameter within said annular body portion, and a plurality of circumferential slots which define a plurality of segments;
   first means for applying a clamping force, said first means having a bore with an engaging surface for receiving and frictionally engaging said compressible member, said frictional engagement between said compressible member and said engaging surface preventing any relative sliding movement between said compressible member and said first means;
   second means for applying a clamping force and for causing said compressible member to slide along said columnar member from an initial position to a preload position where said compressible member is compressed by contact with said engaging surface as said compressible member moves between said positions; and
   said first means being movable to a clamping position where a main clamping force is applied to said columnar member via said compressible member.

3. A mechanism according to claim 2, wherein said compressible member tapers from a base to a leading edge portion and wherein said engaging surface comprises a mating tapered surface.

4. A mechanism according to claim 2, wherein said first means comprises a clamping piston which is movable between a relaxed position and a clamping force applying position.

5. A mechanism according to claim 4, wherein said clamping piston is positioned within a platen and is limited in stroke by a cover plate joined to said platen.

6. A mechanism according to claim 4, wherein said second means comprises a sliding piston which moves within a tip portion of said clamping piston.

7. A mechanism according to claim 6, further comprising:
   an end plate joined to said tip portion of said clamping piston; and
   said end plate and said tip portion of said clamping piston defining a cylinder in which said sliding piston moves.

8. A mechanism according to claim 2, wherein said compressible member is formed from a high strength plastic material.

9. A mechanism according to claim 2, wherein said compressible member is formed from a metallic material.

10. A mechanism according to claim 2, wherein said compressible member has a plurality of longitudinally extending slots to facilitate radial compression of said compressible member.

11. A machine for forming an article comprising:
    a first platen and a second platen movable relative to said first platen;
    a mold formed by a first mold half mounted to said first platen and a second mold half mounted to said movable second platen;
    a tiebar joined to said first platen and passing through at least one of said platens;
    means for applying a clamping force to said mold via said tiebar;
    said clamping force applying means comprising a clamping piston mounted within one of said platens, a sliding piston movable relative to said clamping piston, and a compressible member surrounding said tiebar and having a central bore with a diameter;
    said sliding piston causing said compressible member to slide along said tiebar between an initial position and a preload position where said compressible member grips said tiebar;
    said compressible member being frictionally engaged with a surface of said clamping piston, said frictional engagement preventing sliding movement of said compressible member relative to said surface of said clamping piston;

said clamping piston when moved into a clamping force applying position applying a main clamping force to said mold via said compressible member and said tiebar; and said compressible member having an annular body portion and a plurality of circumferential slots defining a plurality of segments which frictionally engage said clamping piston surface, and movement of said compressible member along said tiebar to said preload position causing a hinging action of each said segment about a respective contact point, compression of said annular body portion, and a decrease in said diameter of said central bore.

12. A machine according to claim 11, wherein said clamping piston surface is tapered and said compressible member tapers from a base to a leading edge portion.

13. A machine according to claim 11, wherein said compressible member is formed from a high strength plastic material.

14. A machine according to claim 11, wherein said compressible member is formed from a metallic material.

15. A machine according to claim 11, wherein said compressible member has a plurality of longitudinal slots therein to facilitate radial compression of said compressible member.

16. A machine according to claim 11, further comprising:
an annular groove in a tip portion of said clamping piston;
an end plate joined to said tip portion of said clamping piston; and
said annular groove and said end plate defining a cylinder for said sliding piston.

17. A machine according to claim 11, further comprising a cover plate joined to said one platen, whereby said cover plate limits the stroke of said clamping piston.

18. A machine according to claim 11, wherein a mold breaking force is transmitted to said mold via said clamping piston, said compressible member, and said tiebar.

19. A machine according to claim 11, further comprising:
a plurality of tiebars extending between said first and second platens;
said clamping force applying means comprising clamping force applying means associated with each of said tiebars;
each said clamping force applying means comprising a clamping piston mounted within said one platen and surrounding a respective tiebar, a sliding piston movable relative to said clamping piston and surrounding said respective tiebar, and a compressible member surrounding said respective tiebar and having a central bore with a diameter;

said sliding piston causing said compressible member to slide along said respective tiebar between an initial position and a preload position where said compressible member is compressed and caused to grip said tiebar;

said compressible member being frictionally engaged with a surface of said clamping piston so as to prevent relative sliding movement between said compressible member and said clamping piston; and said clamping piston when moved into a clamping force applying position applying said main clamping force to said mold via said compressible member and said respective tiebar.

20. A method for applying a clamping force to a mold formed by a first mold half mounted to a first platen and a second mold half mounted to a second platen and having a tiebar extending between said first and second platens on which at least one of said platens move, said method comprising the steps of:

providing a compressible member having a central bore with a diameter about said tiebar, a sliding piston for causing said compressible member to move between an initial position and a preload position, and a clamping piston for applying at least one of a clamping force and a breaking force to said mold;

providing said compressible member with an annular body portion and a plurality of circumferential slots defining a plurality of segments;

activating said sliding piston to cause said compressible member to slide along said tiebar between said initial position and said preload position without causing said compressible member to slide relative to said clamping piston, said activating step causing said compressible member to compress and grip said tiebar;

said sliding piston activating step causing said segments to move about a contact point so that said annular body portion is forced toward said tiebar and causing said diameter of said central bore to decrease; and activating said clamping piston to cause a main clamping force to be transmitted to said mold via said compressible member and said tiebar.

21. The method according to claim 20, further comprising applying said breaking force to said mold via said clamping piston, said compressible member, and said tiebar.

22. The method according to claim 21, wherein said breaking force applying step comprises applying a breaking force which is about 10% of said clamping force.

* * * * *